United States Patent [19]

Plester

[11] Patent Number: 5,102,627

[45] Date of Patent: Apr. 7, 1992

[54] SUPPLY OF CONTROLLED MEDIUM-PRESSURE $CO_2$ GAS IN SIMPLE, CONVENIENT, DISPOSABLE PACKAGING

[75] Inventor: George Plester, Essen, Fed. Rep. of Germany

[73] Assignee: The Coca-Cola Company, Atlanta, Ga.

[21] Appl. No.: 423,697

[22] Filed: Oct. 18, 1989

Related U.S. Application Data

[63] Continuation of Ser. No. 108,921, Oct. 15, 1987, abandoned.

[51] Int. Cl.⁵ .................................................. G05D 16/04
[52] U.S. Cl. ........................... 422/112; 261/DIG. 7; 422/110; 422/120; 422/136; 422/305; 426/477
[58] Field of Search ............... 422/305, 294, 110, 112, 422/113, 120, 236, 237; 220/906, 93, 501, 502, 277, 278; 215/DIG. 8; 206/219, 221-222; 261/DIG. 7; 426/477

[56] References Cited

U.S. PATENT DOCUMENTS

| | | | |
|---|---|---|---|
| 497,097 | 5/1863 | Jackson | 422/236 |
| 576,087 | 2/1897 | Braun | 422/237 |
| 978,641 | 11/1909 | Poe | 422/112 |
| 1,245,807 | 11/1917 | Shaw | 422/112 |
| 1,810,672 | 6/1931 | Minrath | 422/236 |
| 2,062,609 | 12/1936 | Reid | 422/305 X |
| 2,073,273 | 3/1937 | Wetstein | 426/477 |
| 2,170,531 | 8/1939 | Kahn | 426/477 |
| 2,190,688 | 2/1940 | Snelling | 426/477 |
| 2,322,183 | 6/1943 | Ward | 426/477 X |
| 2,855,307 | 10/1958 | König | 426/477 |
| 3,174,833 | 3/1965 | Blackmer | 422/112 X |
| 3,372,996 | 10/1963 | Barrett et al. | 422/236 X |
| 3,453,086 | 7/1969 | Harm et al. | 422/236 |
| 3,476,520 | 11/1969 | Hovey | 426/477 X |
| 3,480,403 | 11/1969 | Hovey | 426/477 X |
| 3,492,671 | 1/1970 | Hovey | 426/477 X |
| 3,516,798 | 6/1970 | Kegan | 422/198 X |
| 3,554,707 | 1/1971 | Holmes et al. | 422/236 |
| 3,585,007 | 6/1971 | Gross | 422/236 X |
| 3,615,252 | 1/1971 | DiPietro | 422/120 |
| 3,820,956 | 6/1964 | Titterington et al. | 422/236 |
| 4,055,632 | 10/1977 | Hoffman et al. | 422/236 X |
| 4,186,215 | 1/1980 | Buchel | 426/477 |
| 4,466,342 | 8/1984 | Basile et al. | 261/DIG. 7 X |
| 4,636,337 | 1/1987 | Gupta et al. | 261/DIG. 7 |
| 5,021,219 | 6/1991 | Rudick et al. | 422/305 X |

Primary Examiner—Robert J. Warden
Assistant Examiner—Amalia Santiago
Attorney, Agent, or Firm—Birch, Stewart, Kolasch & Birch

[57] ABSTRACT

A gas generator chemically generates a gas from a chemical reaction between two reagents contained within a common container. The reagents are normally separated by a gas generation chamber into different regions of the container in the absence of gas generation therein. A reference pressure source of a predetermined pressure forces the two reagents into contact with each other when the pressure of gas in the gas generation chamber is less than the predetermined pressure. A valve in fluid communication with the gas generation chamber is provided to withdraw the generated gas from the chamber when OPEN. As the gas flows through the valve from the chamber the gas pressure in the chamber drops permitting more mixing of the reagents. When the chamber pressure becomes equal to or higher than the predetermined pressure applied by the reference pressure source, the reagents become separated again and gas generation ceases.

12 Claims, 13 Drawing Sheets

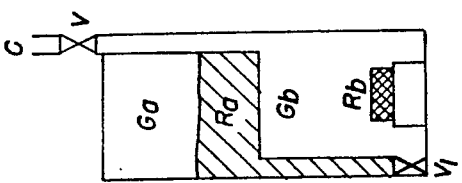
FIG.2D
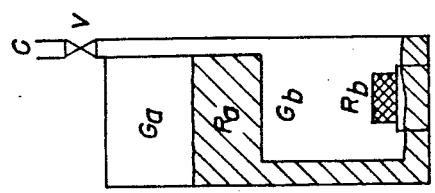
FIG.2C
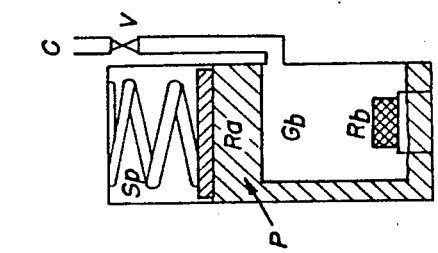
FIG.2B
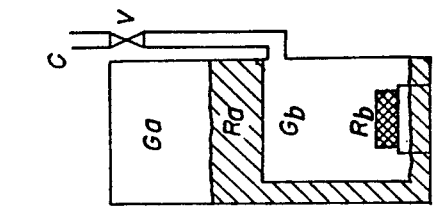
FIG.2A
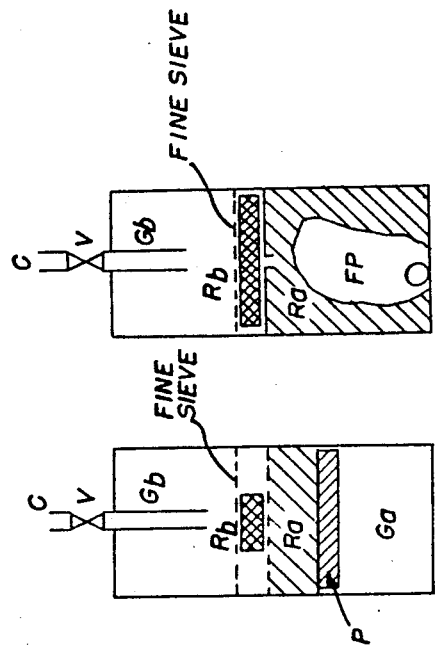
FIG.2H
FIG.2G
FIG.2F
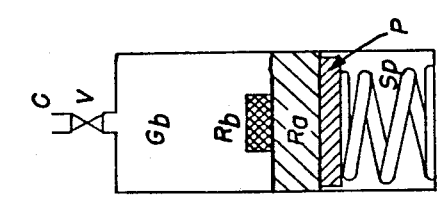
FIG.2E

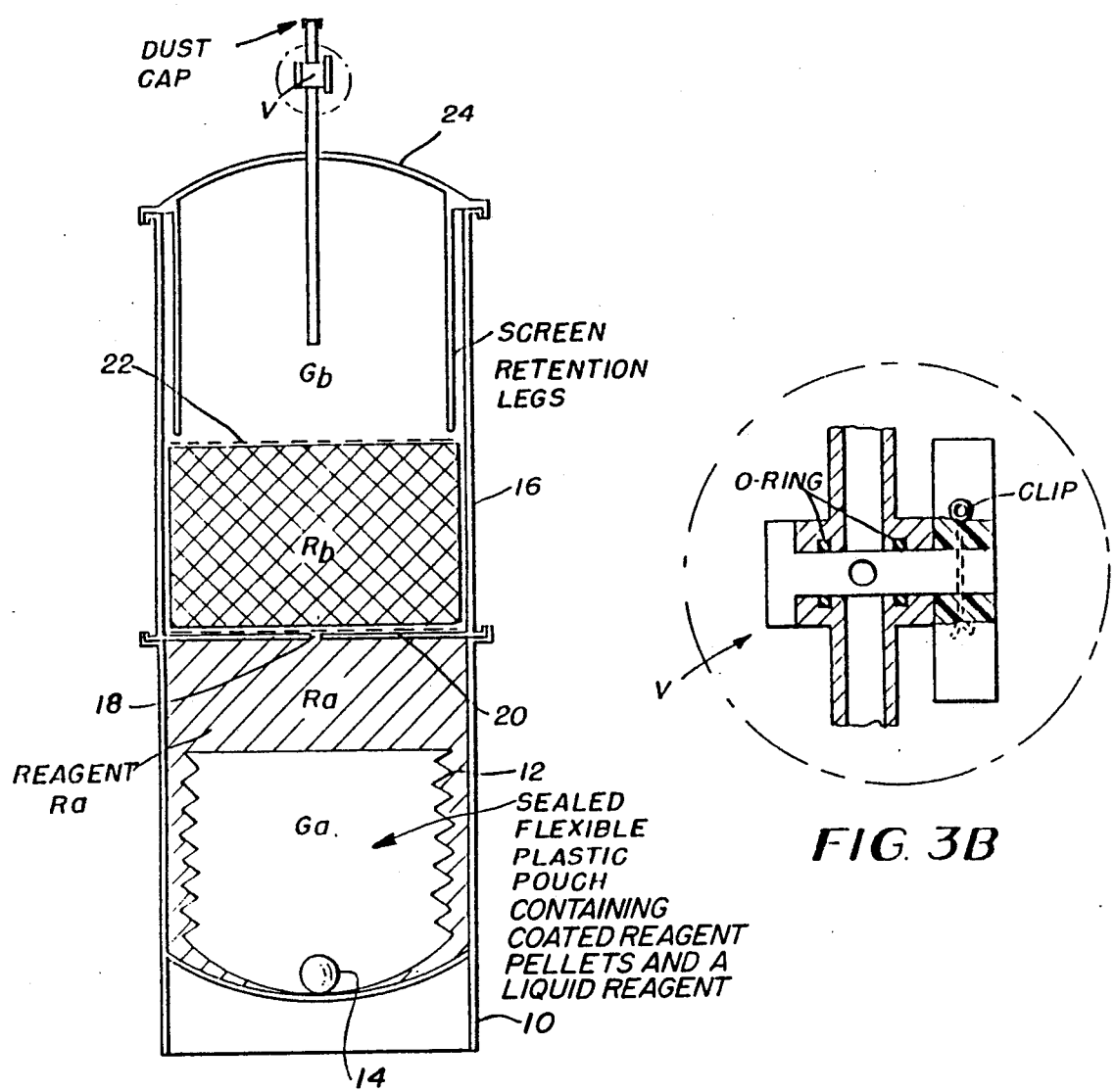
FIG. 3A
FIG. 3B
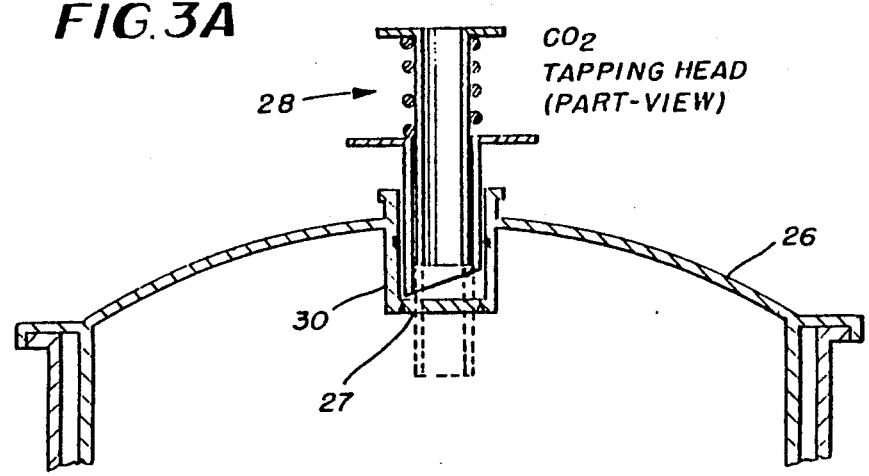
FIG. 3C

GAS GENERATOR: OPTIONAL DESIGN

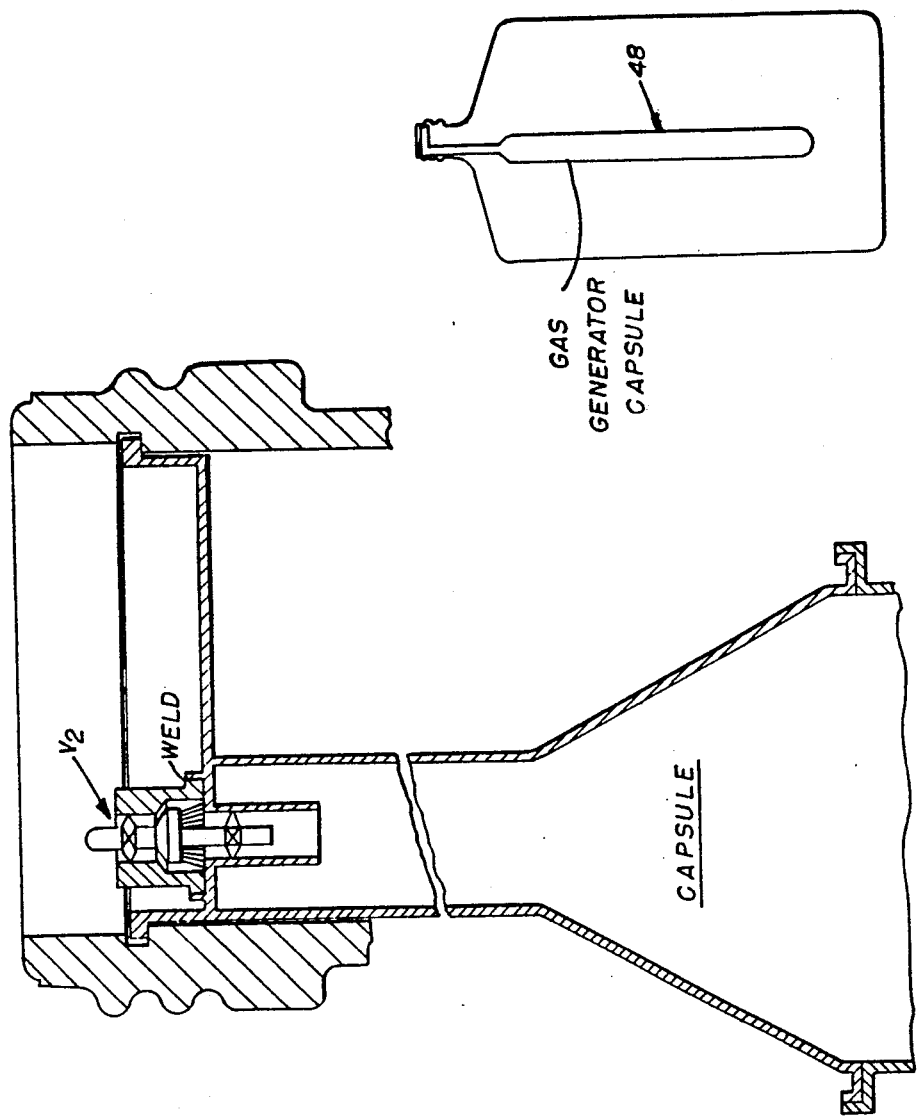
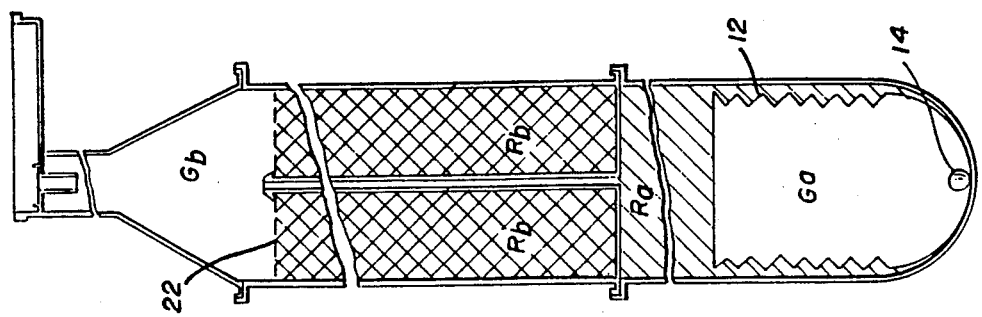
FIG. 4C
FIG. 4B
FIG. 4A

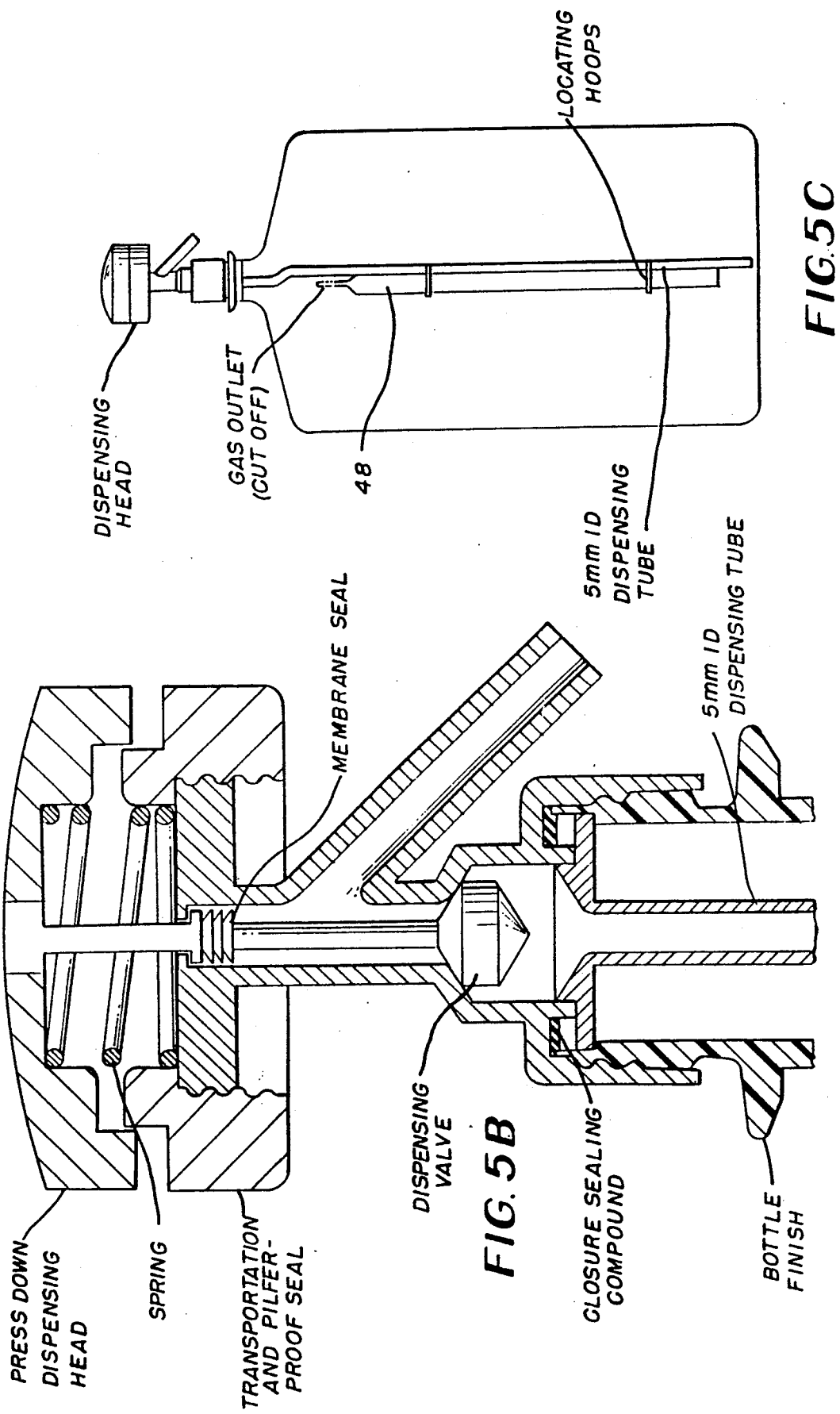

SUPPLY OF CONTROLLED MEDIUM-PRESSURE CO₂ GAS IN SIMPLE, CONVENIENT, DISPOSABLE PACKAGING

This application is a continuation of application Ser. No. 108,921 filed on Oct. 15, 1987, now abandoned.

BACKGROUND OF THE INVENTION

The present invention relates to a disposable $CO_2$ gas generator which utilizes chemical reactants to generate the $CO_2$ gas. Conventional $CO_2$ gas cylinders are heavy, relatively expensive and available only as returnable, refillable packages. Since such cylinders are under very high pressure, handling requires appropriate care.

With the trend toward mini-sized and home-dispensers for soft-drinks, where the syrup-packaging is generally one-way, it is logistically attractive to make one-way $CO_2$-packaging also available. Moreover, certain conventional distribution channels, such as super-market stores, could only be effectively exploited if one-way packaging were available. An additional factor is that lay dispenser-users are understandably nervous of handling high-pressure gas cylinders. High-pressure $CO_2$-capsules, generally containing about 8 g $CO_2$, are already available, but these are expensive and restricted in practical capacity to a limit of around 16-20 g. They do not, therefore, represent a solution, since such quantities are barely sufficient for carbonating 2 liters of beverage without reckoning the considerable additional $CO_2$ quantities needed for propulsion of the beverage in the dispenser.

Inexpensive, light-weight, unpressurized or moderately pressurized $CO_2$-packaging can therefore provide a whole scope of new business opportunities with respect to small-sized dispensers designed for non-professional users.

SUMMARY OF THE INVENTION

Accordingly, it is a primary object of the present invention to provide a device, which enables the generation of gas at a predetermined pressure, by automatically mixing the necessary reagents to the required degree.

It is another object of the present invention to provide a fully automatic gas generator which is also portable and easily deliverable.

It is yet another object of the present invention to provide a disposable gas generator which is at or near user pressure.

It is still another object of the present invention to provide a non-pressurized device which can be combined with an outside reference pressure source to generate gas automatically by mixing the necessary reagents to the degree required to maintain the reference pressure.

It is a further object of the present invention to provide a device, which can maintain a predetermined pressure in the head-space of a beverage bottle during use.

It is yet a further object of the present invention to provide a device, which can maintain a predetermined pressure in a liquid container and also propel the liquid through a simple dispensing head.

It is still a further object of the present invention to provide a dispensing head for a container of a simple disposable construction.

It is another object of the present invention to provide a gas generator capsule construction suitable for use in an aerosol container for maintaining head space pressure.

The solution of the present invention involves the use of a substance, such as sodium bicarbonate, which in contact with a liquid acid, such as phosphoric acid, generates $CO_2$. Alternatively, a powdered mixture of bicarbonate and a solid acid, such as citric acid, may be employed and then only water is needed to release the $CO_2$ gas. The chemicals used can be types normally found in beverages, so that their use in a beverage dispensing system, or other food application, need not arouse concern. Since the chemicals only generate a gas pressure when they are mixed in the aqueous state, their packaging can be relatively simple.

Chemical generation of $CO_2$ gas is well-known but has so far had limited application, since a convenient, simple method enabling $CO_2$-gas generation at a controlled user pressure of the order, say, of 1-8 Bar has not been available. According to the present invention, devices are provided which package the chemicals within a system, which releases $CO_2$ at a predetermined pressure. It allows the chemicals to be consumed only as and when $CO_2$-gas is drawn off, whereby the chemicals react just sufficiently to maintain the required user pressure. The net result is that the chemical mixture can either be supplied as a liquid system or as a liquid-solid system or finally as a solid system, depending on application. It can be contained in relatively simple plastic packaging, capable of withstanding only moderate pressures, or depending on the system employed by the user, even in non-pressurized dry solid form. This involves relatively inexpensive packaging and the system as a whole can provide the user with simplicity and convenience.

Furthermore, a convenient $CO_2$ gas-generation package has uses in many household applications associated with beverages and other products, aside from direct use in beverage dispensers. Examples of these are:

Capsules inserted in large carbonated beverage bottles, which release $CO_2$ once the closure is applied, and thus maintain a $CO_2$ pressure in the head-space of the package until the product is consumed. In this way, the freshness of the beverage can be maintained throughout the period of consumption, providing improved quality with larger packages. Such a device would be pencil-like in shape, inserted within the bottle during the bottling process prior to capping and additionally ensure a high shelf-life without requiring exceptional barrier properties in the package itself.

Inclusion of gas-generator in simple dispensing heads, thus maintaining a head-space pressure in extra-large beverage bottles and bottles of other products, so that the user may dispense the liquid by simply pressing the dispensing head. This will improve the convenience of large liquid packages. In the case of carbonated beverages, it will enable the sale of ready-for-use "premix" dispensers comprising a large bottle, a simple dispensing head and a $CO_2$-gas generator.

Inclusion of gas-generator in devices requiring a propellant gas, such as aerosols. Here the availability of a controlled, low-pressure source of $CO_2$ within the aerosol will resolve a continuing industry problem. Current propellants for aerosols are liquids with low boiling points, which additionally must be non-inflammable and have harmless vapours. While presently used halogenated hydrocarbons are variously suspect on health, environmental, and other grounds, $CO_2$ is both non-flammable and completely harmless both to the environment and to humans.

It is proposed to describe herein the principles of the $CO_2$-gas generator of the present invention in some of its various possible forms and also to describe its embodiment with reference to the various applications described above.

A laboratory gas-generator, generally referred to as "Kipps Apparatus" is well-known, but this produces gas at pressures barely above atmospheric and cannot be transported. Other systems currently available using acid/bicarbonate chemicals involve the user in inconvenient manipulation. The system of the present invention can provide medium pressure gas, in transportable and convenient form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A to 2H are diagrammatic views illustrating variations of the basic principles of the gas generators of the present invention;

FIG. 3A is an elevational sectional view of one embodiment of a gas generator of the present invention;

FIG. 3B is an enlarged cross-sectional view of the $CO_2$-valve (V) of FIG. 3A;

FIG. 3C is a cross-sectional view illustrating an alternative arrangement for outputting $CO_2$ gas from the gas generator;

FIG. 3I shows an embodiment of the present invention with the valving arrangements illustrated in FIGS. 3G and 3H;

FIGS. 4A to 4C show a gas generator capsule of the present invention inserted in a beverage bottle; FIG. 4A being a sectional view of the capsule, FIG. 4B a partial sectional view of the capsule in a bottle, and FIG. 4C a diagrammatic view illustrating the relative proportions of the capsule and the bottle;

FIGS. 5A to 5C illustrate the use of the gas generator of the present invention in a beverage bottle equipped with a manually actuable dispensing head.

DETAILED DESCRIPTION OF THE INVENTION

Basic Principles

Figure 1A:
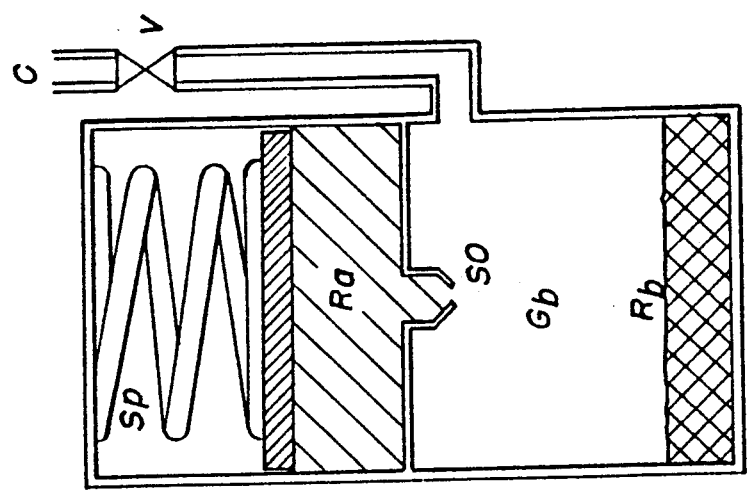
FIGS. 1A to 1C are diagrammatic views in side elevation illustrating the basic principles of the gas generators of the present invention.
Figure 1B:
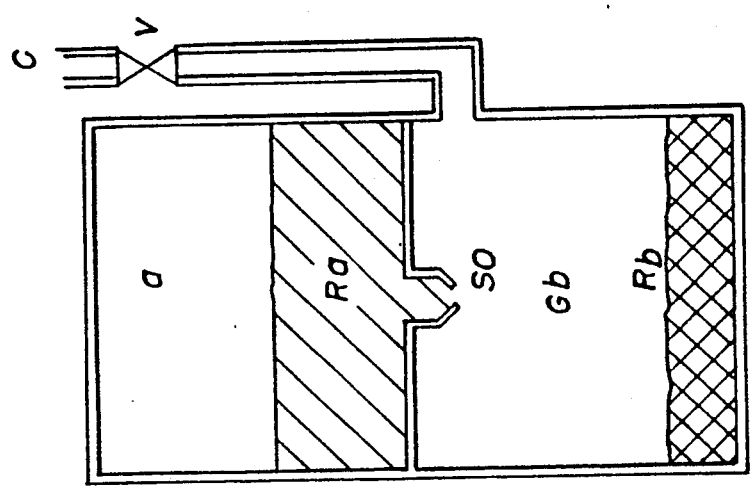
Figure 1C:
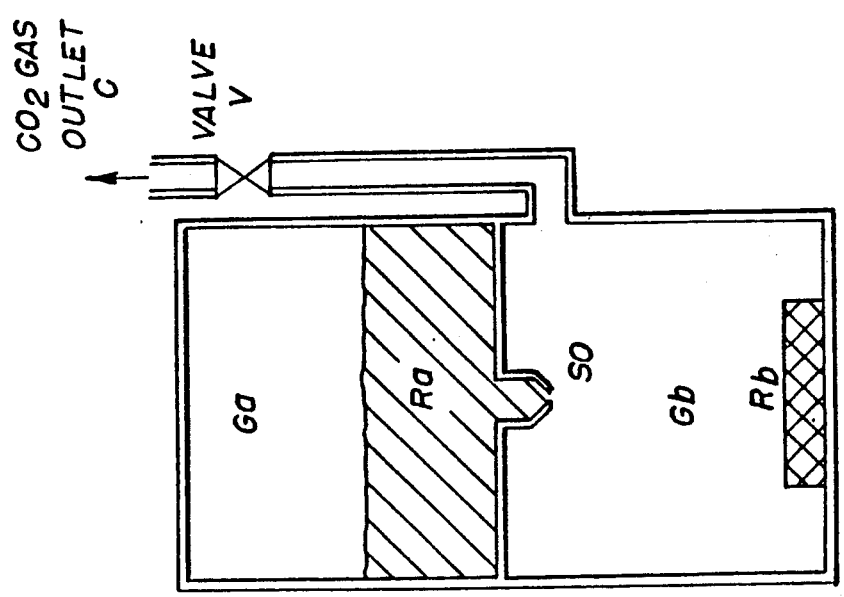

The basic principles are shown in FIG. 1A to 1C. Firstly, in FIG. 1A, a pre-pressurized gas chamber $G_a$ presses a reagent $R_a$ through a small orifice SO. As reagent $R_a$ contacts reagent $R_b$ in the lower chamber $G_b$, $CO_2$ gas is released. Reagent $R_a$ continues to flow through to the chamber $G_b$, until the gas pressure in chamber $G_b$ is equal to that of chamber $G_a$. Flow stops due to the surface tension of liquid $R_a$. When gas is drawn off by opening valve V, more reagent $R_a$ flows into chamber $G_b$ so as to equalize pressures again. The pre-set pressure in chamber $G_a$ acts as a reference and controls the product gas-pressure accordingly. It acts in effect as a pre-set pressure memory. As a result, the gas content of reagents $R_a$ and $R_b$ is released only as it is used and the total pressure of the system does not exceed that of the pre-set reference $G_a$, which in effect is the user-pressure, i.e. the lowest system-pressure possible. The system is automatic in response and once pre-packaged delivers gas at the pre-arranged pressure until the reagents are exhausted. The user only needs to open valve V. Simple materials can be used for packaging the system, since relatively low pressures are involved.

Regarding the reagents, many options are available. Reagent $R_a$ can be simply water, whereby $R_b$ would then be a solid mixture of alkali and acid (e.g. sodium bicarbonate and citric acid). Alternatively, $R_a$ could be an acid solution (e.g. phosphoric acid) and $R_b$ an alkali such as sodium bicarbonate, enabling quicker system responses to pressure change. For rapid system response to pressure change, both $R_a$ and $R_b$ could be aqueous solutions, as indicated in FIG. 1B.

The pressure memory provided by gas chamber $G_a$ can be replaced by a mechanical system, such as a spring, if this is more convenient to a particular application (see FIG. 1C). In such a case the gas chamber $G_a$ is replaced by the spring $S_p$ and a piston or membrane P, or by similar devices. All devices must have the effect of providing a constant and desired pressure at the orifice SO.

Depending on application, other variations of the basic principle are possible and some of these are shown in FIGS. 2A to 2H.

For example, the reagents $R_a$ and $R_b$ may be allowed to achieve a balance, whereby reagent $R_a$ is pushed back into chamber $G_a$ once gas pressures in $G_a$ and $G_b$ have equalized. This feature can be used, where precise control of the equilibrium is desirable. In FIG. 2A, reagent $R_a$ flows into reagent $R_b$ until the gas pressure is in equilibrium with $G_a$. At that point, the reagent $R_a$ is pushed back by the pressure away from $R_b$, stopping the reaction.

In FIG. 2B, the same effect is achieved using a spring $S_p$ or similar mechanical pressure exerting device, with a piston or membrane, instead of a pre-set gas pressure.

In FIG. 2C the gas is ducted internally to the top of the device, which may be important in certain applications.

For applications where the gas outlet is better placed at the top of the system, FIGS. 2E and 2F illustrate the same principles as FIGS. 2A, 2B and 2C but here the position of the reagents is reversed.

During transportation, the reagent $R_a$ ducts in FIG. 2A, 2B, 2C, 2E and 2F would have to be capped and opened at the time of use. Otherwise inadvertent mixing of reagents could occur. This can be achieved by a simple valve arrangement, which is opened when the gas-generator is finally connected for use. An example of this valving ($V_1$) is given in FIG. 2D.

Alternatively, the reagent $R_b$ can be suspended and located centrally between two fine sieves as illustrated by FIG. 2G. The reagent $R_a$ does not reach $R_b$ even if the container is placed in a horizontal or vertical position and cannot run out of the gas outlet because of the configuration of the gas outlet tube C. Pressure chamber $G_a$ acts through a membrane or piston and this gas cannot mix with the gas in $G_b$. This container can be transported without disturbing the system and is always ready for use once valve V is opened. A variation of the same system would be to use a spring as shown in FIG. 2F.

Another variation of a transportable system, as shown in 2H, would be to suspend the reagent $R_b$ between 2 fine screens and to supply reagent $R_a$ through a small orifice. All previously described methods of pressuring $R_a$ to a predetermined level can be used or alternatively a pre-pressurized flexible pouch, dead-weighted so that it sinks to the bottom of the container. The pouch FP expands to maintain pressure $G_b$. Once $G_b$ is in equilibrium with the pressure in FP, the reagent $R_a$ is pushed back into its own chamber and gas generation stops. Surface tension forces prevent leakage of reagent $R_a$ onto $R_b$ once pressures in FP and $G_b$ are equalized, even if the device is inverted or placed in a horizontal position.

The above variations are intended to indicate only a part of the range of options available, using the same basic principles. All may have application depending on the type of user-system employed.

Pre-pressuring of gas-space $G_a$ or pouch FP can be achieved by using coated reagent $R_b$ pellets together with reagent $R_a$. Thus the space (or pouch) can be sealed in an unpressurized state and the pre-determined pressure (dependent entirely on the quantity of reagents used) is generated some time after packing. The slowly-dissolving coating could, for example, be sugar or some other slowly-dissolving medium in water.

As a further option, the pressurized pouch can contain a liquid whose boiling point is chosen to provide a constant pressure at the operating temperature. Such an arrangement would be more compact, since a pre-pressurized pouch or chamber, using gas only, must have a volume which is relatively large compared with unacceptable pressure variations.

Physical Construction

Gas Generator

Figure 3D:
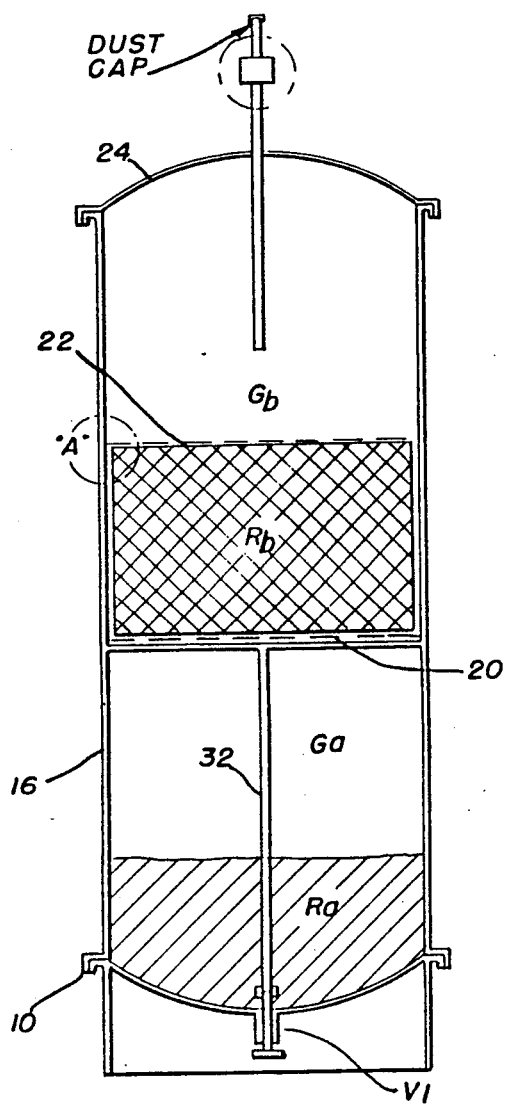
FIG. 3D is an elevational cross-sectional view of another embodiment of the present invention
Figure 3E:
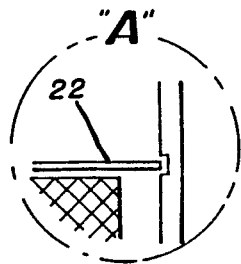
FIG. 3E is an enlarged view showing detail "A" of FIG. 3D.
Figure 3F:
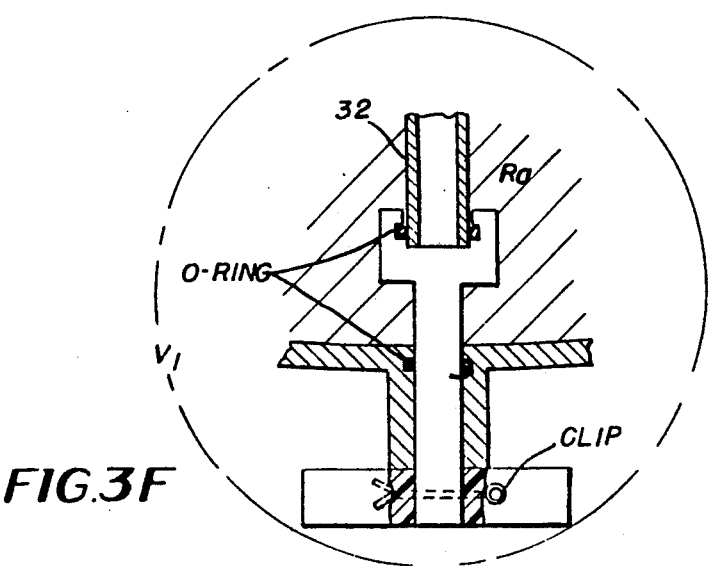
FIG. 3F is an enlarged view showing details of valve $V_1$ of FIG. 3E.

One embodiment of the gas-generator, based on the principles already described, and constructed from moulded plastic parts, is shown in FIG. 3A. The base section contains a 12 with a dead-weight 14 flexible plastic pouch therein. In the manner already described, this pouch has been filled with coated reagent $R_b$ pellets and liquid reagent $R_a$ in correct proportions so as to generate the desired pressure, once the coating has been dissolved some time after sealing. The liquid reagent $R_a$ is also filled into this base section 10 around pouch 12. Since the flexible pouch 12 first expands at a later state, the base section 10 is only partly filled and presents no handling problems in assembly. The middle section 16, also moulded plastic, comprises a small orifice 18 in its base. A circular filter paper 20 is laid over the orifice 18, covering the entire base and the reagent $R_b$ is poured in pellet or powder form on top of the filter. A fine retention screen 22 is laid over the reagent $R_b$. The top section 24, also moulded plastic, is then applied and holds down the reagent retention screen 22. The joints of the three sections are welded by appropriate means. Some time after assembly, the coated pellets in the flexible pouch 12 dissolve and the pouch expands pushing reagent $R_a$ through the orifice 18 and onto reagent $R_b$. As soon as the gas pressure in the gas-space $G_b$ rises up to the predetermined pressure within the pouch, the reagent $R_a$ is expelled into the lower compartment and the pouch is forced to contract appropriately. Thereafter, the pouch re-expands to bring reagent $R_a$ in contact with $R_b$, whenever the gas-space pressure falls, and thus maintains the required gas supply pressure.

$G_a$s is drawn-off through a simple valve such as illustrated in FIG. 3B. Alternatively, a simple tapping device may be used as shown in FIG. 3C. Here, the dome 26 of the device is punctured at a pre-determined break-point 27 by an external tool 28 which at the same time seals against the entry duct. The same break-point 27 serves as the pressure safety disc of the device.

The system is transportable once the gas-space has achieved equilibrium pressure (shortly after assembly) since surface tension forces at the orifice will not permit liquid to enter the reagent $R_b$ space.

Figure 3G:
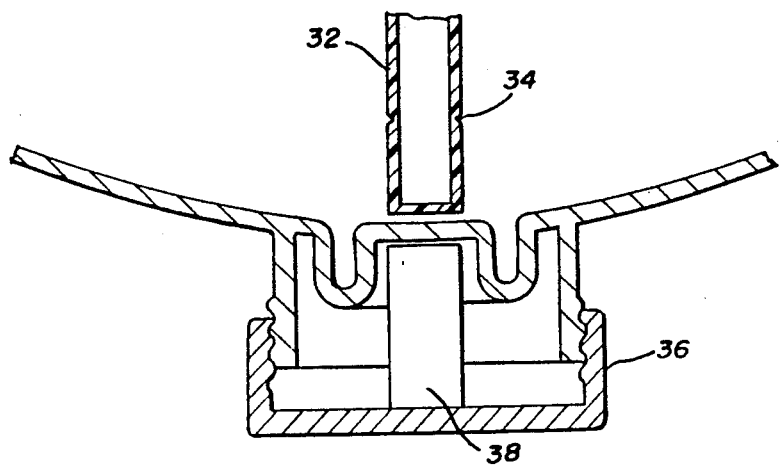
FIG. 3G shows an alternative construction to the valve $V_1$ of FIG. 3E.
Figure 3H:
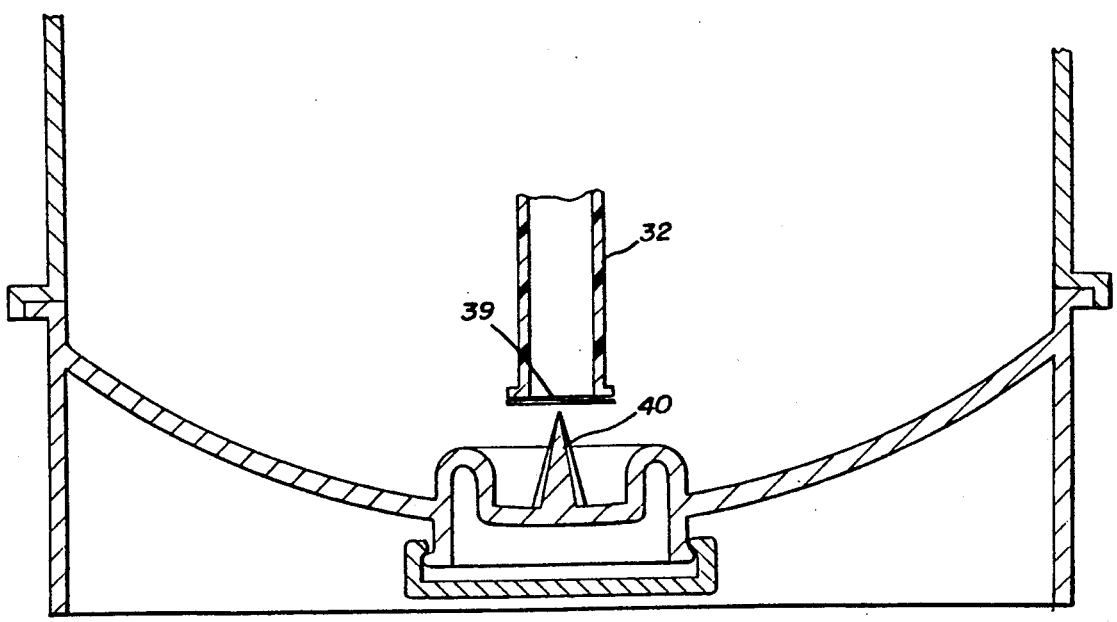
FIG. 3H shows still another alternative construction for the valve assembly $V_1$ of FIG. 3E.
Figure 31:
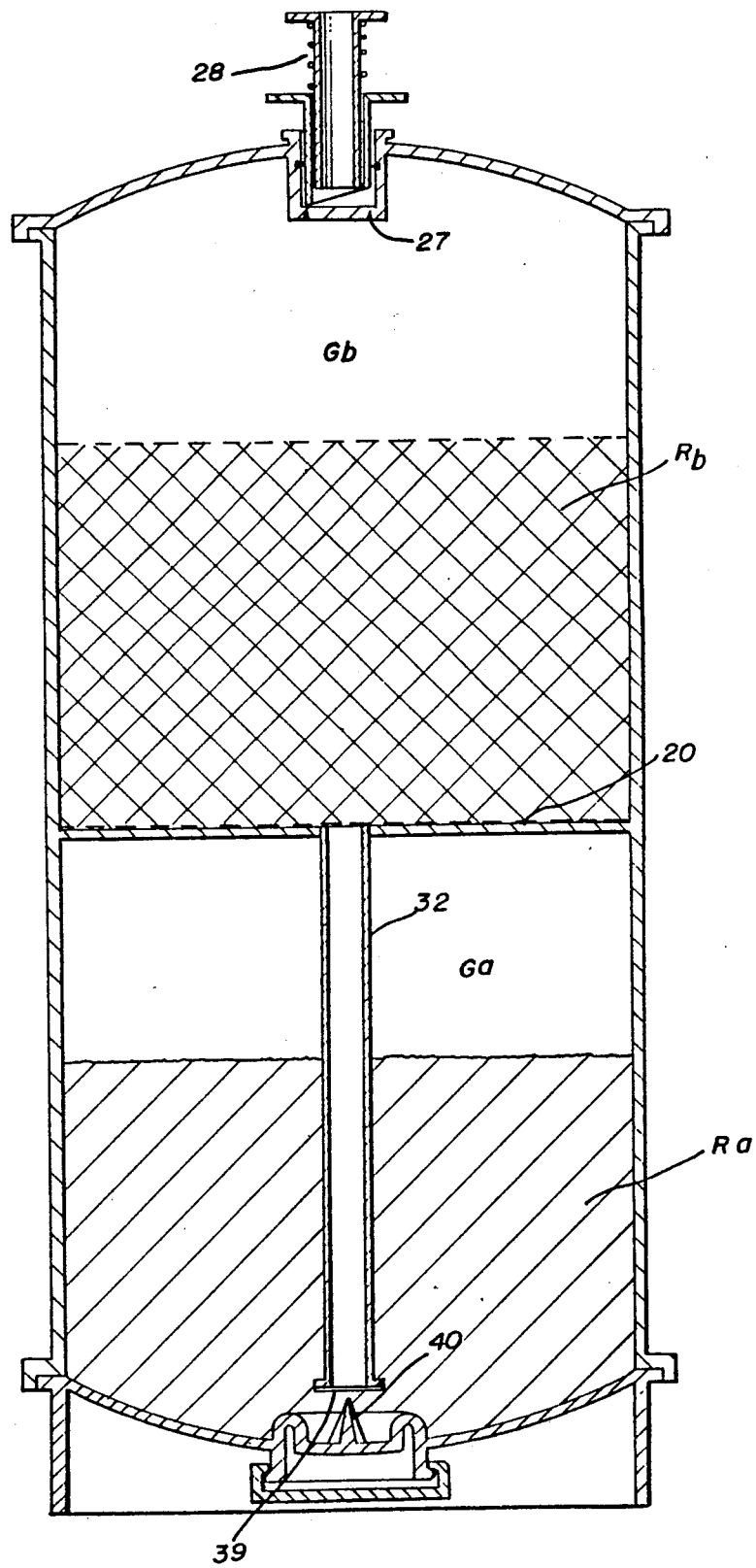

Similar embodiments involving the other basic systems described in 2A to 2H above are also possible by employing the principles outlined. A further embodiment is illustrated by 3D. Here the pre-determined pressure is provided by gas space $G_a$ and reagent $R_a$ is pushed up a tube 32 to $R_b$. When pressure $G_a$ and $G_b$ have equalized, $R_a$ returns down to the tube 32 to its own space and the reaction stops. For transportation a simple valve $V_1$ at base of central tube 32, can be used. Alternatively, as shown in FIG. 3G, the central tube 32 can be sealed at the base and have a pre-determined break-point 34, which is broken by pressing in the base prior to use. The appropriate pressure can be applied by rotating an external cap 36 including a pressure applying pin 38. A further variation of the same principle is shown in 3H, whereby the central tube 32 has a foil seal 39 which is punctured by pressing in the base. This is done by pressing the cylinder against an external protrusion 40. (For example, a protrusion in the $CO_2$-compartment base in a dispenser.) FIG. 3I shows an embodiment of 3D with the valving arrangements described in FIGS. 3G and 3H.

Figure 3J:
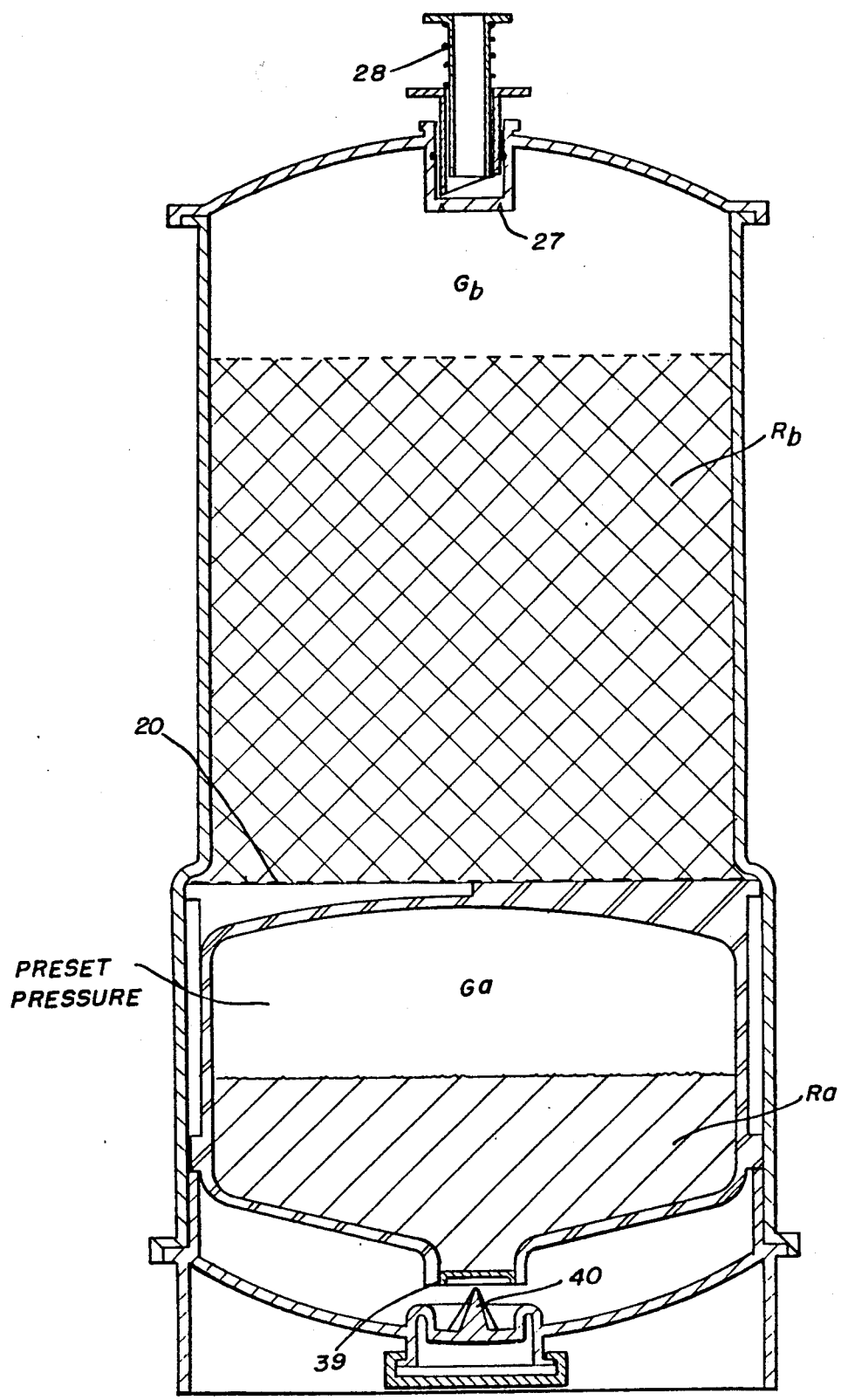
FIGS. 3J and 3K are further embodiments of the present invention.
Figure 3K:
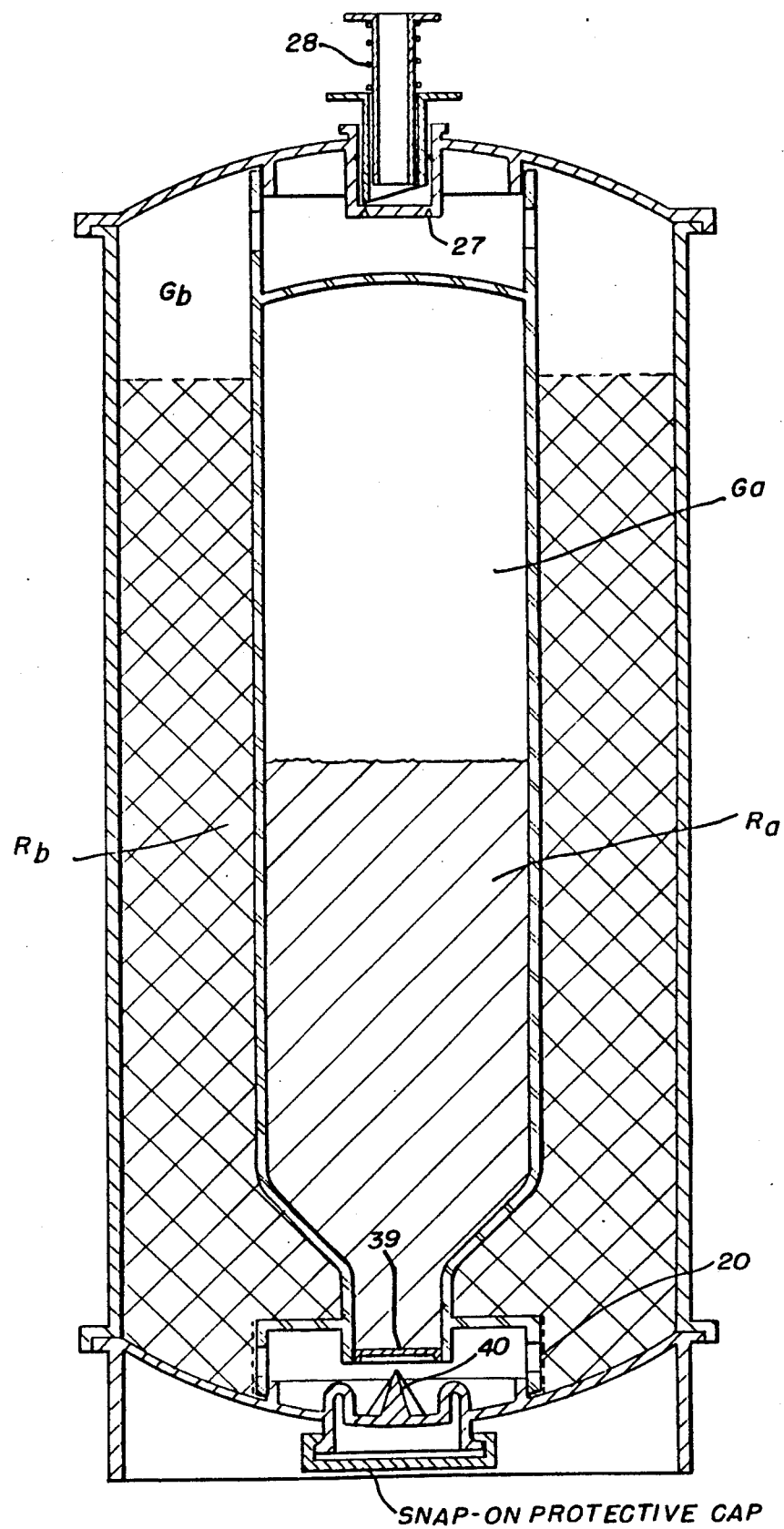
Figure 3L:
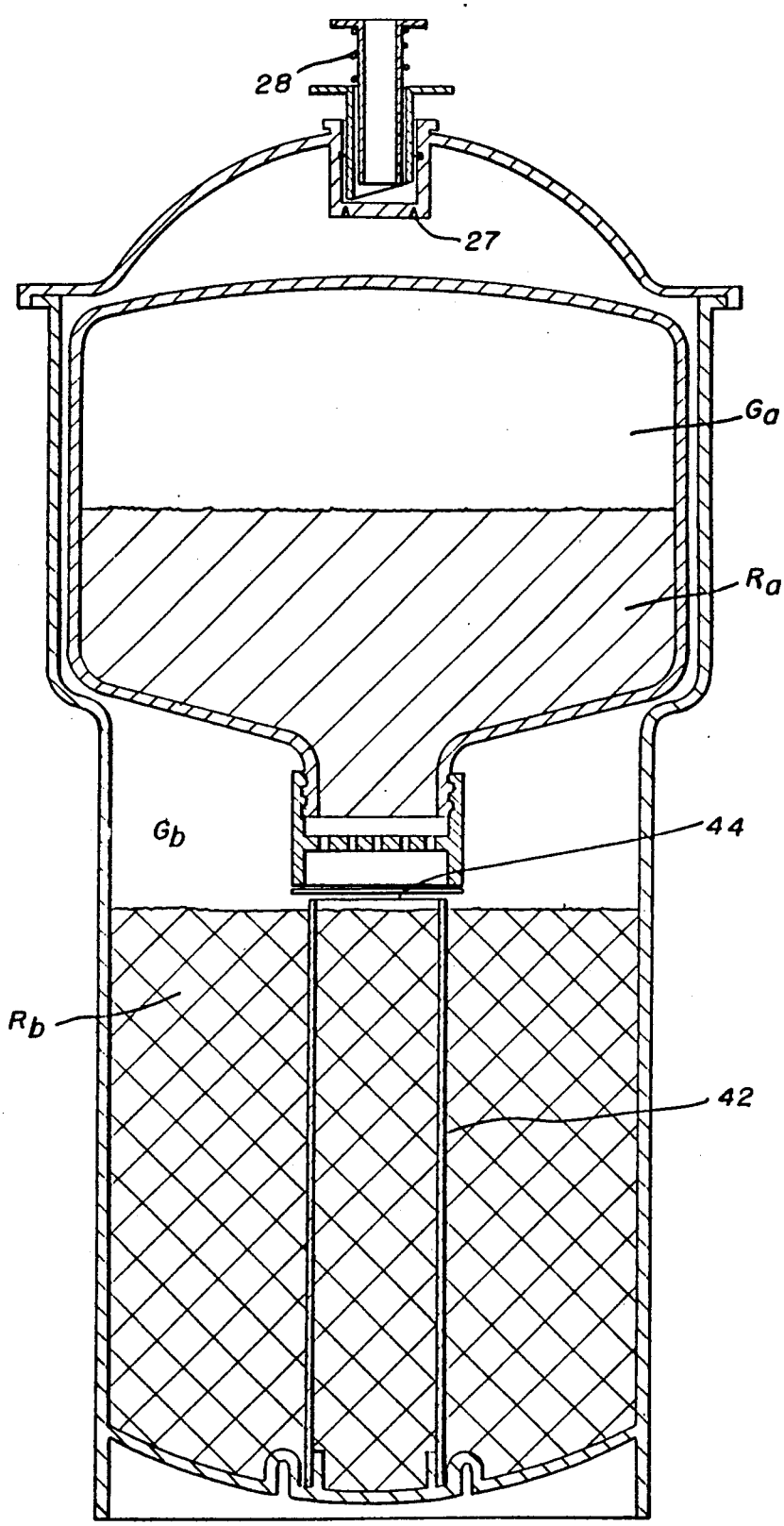
FIG. 3L is an embodiment of the invention employing only liquid reagents.

FIGS. 3J and 3K are further embodiments of the principles described, which may prove easier to manufacture in a high-speed line. FIG. 3L is an embodiment of a system employing only liquid reagents for $R_a$ and $R_b$. Here the flow of reagent $R_a$ stops, once pressure-equilibrium between $G_a$ and $G_b$ has been reached, due to the action of surface tension forces in the orifices at the base of chamber $G_a$. The reagent $R_a$ is released at the time of use by pressing in the base, which in turn raises the puncturing tube 42 to break the foil seal 44 at the base of chamber $G_a$.

Figure 3M:
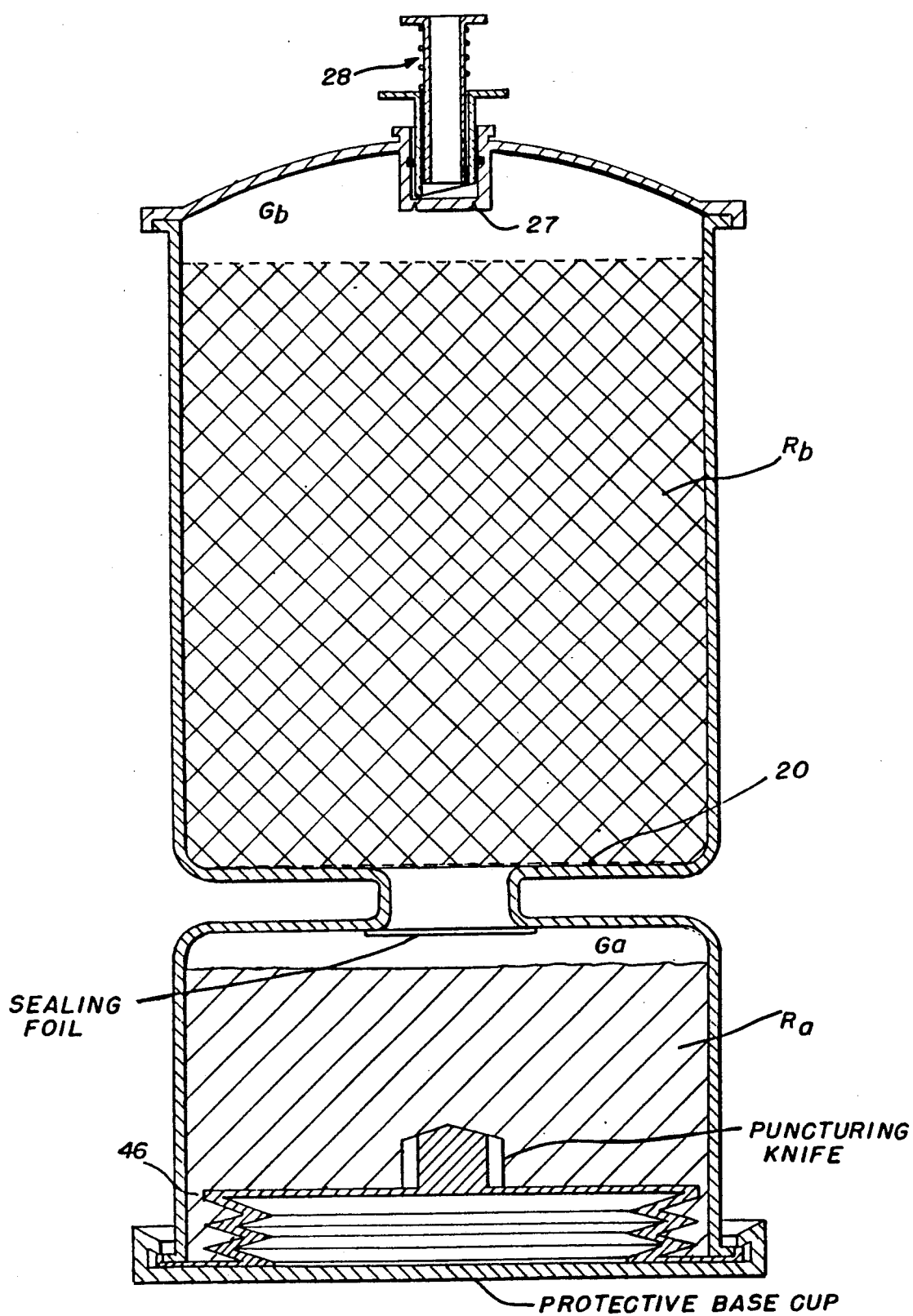
FIG. 3M shows an embodiment of the present invention utilizing an external reference pressure source.

Provided the device is to be used in a dispenser, which can be designed to provide the necessary pressure on reagent $R_a$ externally, a non-pressurized generator, with all the attendant production and transportation advantages, is possible. An embodiment of this is shown in FIG. 3M. Now there is no in-built pressure memory, and in its place, a simple bellows 46 or membrane or piston is used. The reference pressure is applied from an external source, within the equipment employing the generator, and this presses the bellows 46. Thereafter, the generator operates as already described.

Beverage Refresher

The gas generator can be constructed as a capsule which is inserted in a beverage bottle and releases gas only when the closure is applied. An embodiment of this is shown in FIGS. 4A and 4B. The gas generator itself employs one of the principles explained above, but many of the other principles could also be adapted to this application.

The capsule is pencil-shaped so that it can be passed through the normal finish of a bottle (see FIG. 4C). The capsule of FIG. 4A comprises the same 4 basic components already outlined above for the gas generator: a base-section containing reagent $R_a$, a pre-pressurized pouch, a middle-section containing reagent $R_b$, a top-section (which in this case locates in the mouth of the bottle) and finally a gas-valve, which in this case is opened by the pressure of the applied closure. The middle-section has an orifice which protrudes above the surface of the reagent $R_b$. The fine screen or sieve, retaining the reagent $R_b$ is pressed over the lips of the orifice and located by protrusions on the outside of the orifice tube. Reagent $R_a$ flows onto $R_b$ until the gas space achieves equilibrium with the pressure of the flexible pouch. A simple moulded plastic valve $V_2$, which is actuated by the downward pressure of the closure is welded to the top-section. The embodiment of this valve is illustrated in FIG. 4B, together with the method of location of the capsule in the mouth of the beverage bottle. The valve consists of 2 moulded plastic parts: the valve housing and the valve spindle. The valve spindle locates in the ga exit tube and is moulded with a series of fingers, which act as springs. Assisted by the gas pressure, the springs help to seat the valve, whenever the downward pressure of the closure is removed. Thus, no gas escapes while the bottle is open.

When the closure is reapplied, gas is generated and fills the bottle head-space until this is at equilibrium with the pressure in the flexible pouch.

During transportation of the bottle, the gas valve is open. It is, in fact, open at all times after the bottle is first capped. However, no reagents can pass into the beverage since the reagent immediately below the gas valve is powder, the gas exit tube is constructed so as to prevent liquids/solids escaping, and the gas pressure helps to keep the liquid in the lower space. Moreover since beverage-type components are used as reagents, a leakage of the capsule would not affect the safe consumption of the beverage.

Finished Beverage Dispenser

The gas-generator may be used to maintain a gas pressure in the head-space of a beverage bottle (or other liquid container) and thus enable the beverage (or other liquid) to be dispensed through a dip-tube by opening a valve at the head of the dip-tube. An embodiment of this is shown in FIG. 5A, 5B and 5C.

Figure 5A:
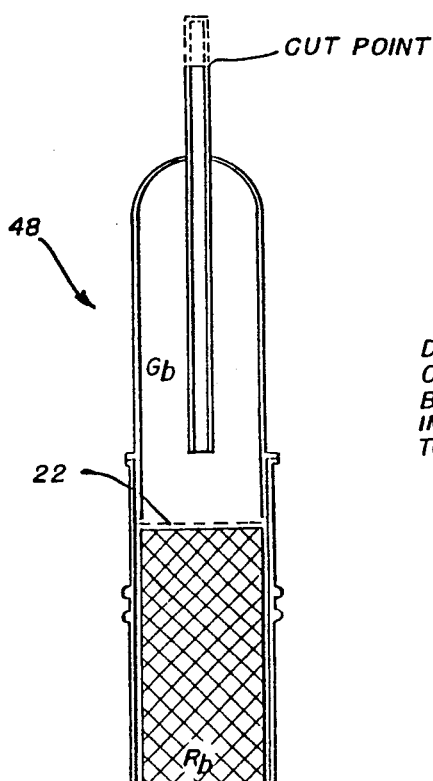

The gas-generator capsule is shown in FIG. 5A. It consists of a base section containing reagent $R_a$ and including a pre-pressurized flexible plastic pouch, a middle section containing reagent $R_b$ and including an orifice, filter-paper and retention screen; and a top-section which holds down the screen and includes the gas outlet. The gas-outlet is sealed when the gas generator is assembled and the tube is cut to initiate gas release immediately prior to cap application after filling. The gas is generated, in the mode already described, to maintain a head-space gas-pressure in the bottle.

The gas-generator is cradled in moulded support hoops on the dispensing dip-tube, as shown in FIG. 5C.

A dispensing head embodiment is shown in FIG. 5B. It consists of five parts: a capping section, which screws onto the threads of the bottle-finish and connects to the dip-tube, a valve-spindle, a transportation sealing lock-ring, a spring and a press-down-head. The capping-section includes a spout. The valve spindle seats against a shoulder on the base of the capping section and opens the flow when depressed downwards. A series of membranes, moulded onto the valve spindle, seal against the bore of the top of the capping section to prevent liquid leakage. The spring presses the valve spindle upwards so as to close the valve. In this it is assisted by the head-space pressure within the bottle. When the spring is compressed by a downward pressure on the dispenser head, the valve opens and liquid flows, propelled by the gas-pressure in the head-space. For safe transportation, the sealing lock-ring presses the dispensing head upwards ensuring that the dispensing valve remains closed. The user breaks the seal of this ring by screwing it downwards to a stop. This frees the dispensing head and enables it to be used. All 5 dispenser-head parts described are constructed of moulded plastic.

Aerosol Application

Figure 6A:
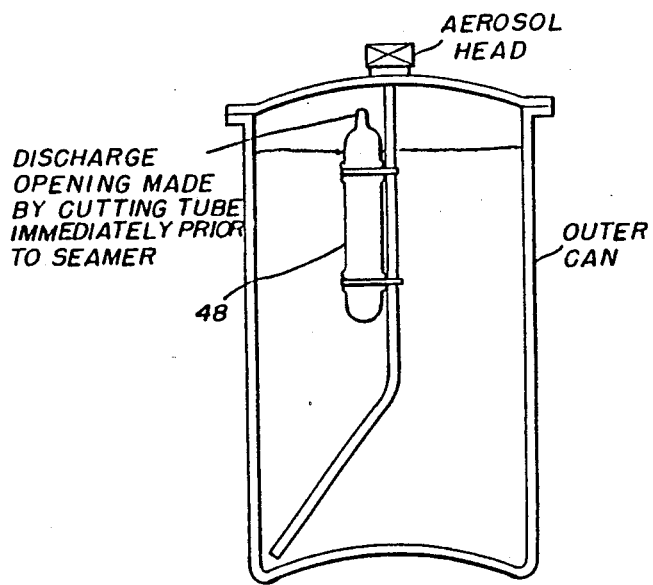
FIGS. 6A and 6B illustrate the use of a gas generator capsule of the present invention in an aerosol container for maintaining the required gas head-space pressure therein.
Figure 6B:
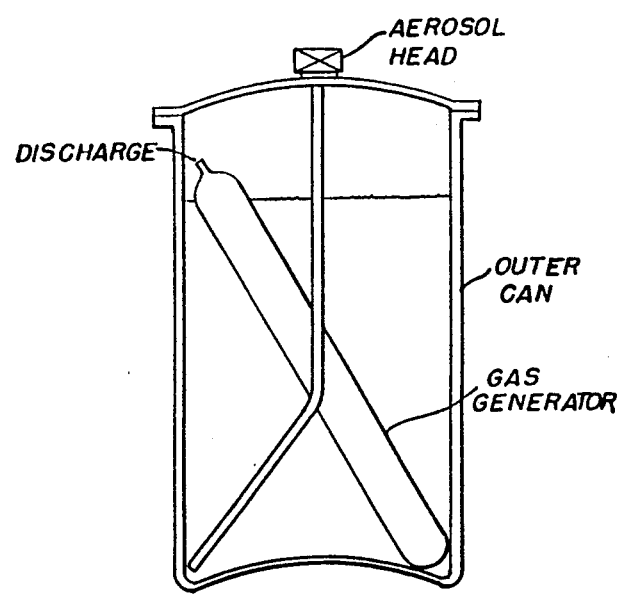

The capsule described above for the finished beverage dispenser can be also used to maintain a required gas head-space pressure in an aerosol. Two examples of such an assembly are shown in FIGS. 6A and 6B. This employs the principles already described. The release of gas can be initiated by cutting the gas outlet tube shortly before the aerosol is sealed or by employing a simple valve, as shown in principle in FIG. 4B, which opens on application of the container lid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

What is claimed is:

1. An article of manufacture for chemically generating gas and supplying the gas to a utilization device at a predetermined pressure comprising:
 a container in which the gas is generated by a chemical reaction between a first liquid reagent and a second solid reagent contained therein, said container including
 a base section containing said first reagent and reference pressure means for exerting a predetermined pressure against said first reagent,
 a middle section containing said second reagent, said middle section including a partition contiguous the base section having orifice means formed therein between said first and second reagents, filter means disposed on the second reagent side of said orifice, and a screen disposed over said second reagent, and a top section above said screen defining gas generation chamber above said second reagent;

valve means disposed in said top section in fluid communication with said gas generation chamber for withdrawing gas therefrom when open and preventing the flow of gas therefrom when closed;

wherein said orifice means is of a size selected as a function of surface tension properties of the liquid reagent for permitting said first and second reagents to mix with each other and generate said gas into said gas generation chamber only when the pressure in said gas generation chamber is less than the reference pressure exerted against said first reagent, and precluding the mixing of said first and second reagents only when the pressure in said gas generation chamber is equal to or greater than the reference pressure exerted against said first reagent, and whereby the pressure of gas withdrawn through said valve means when OPEN is substantially maintained at said reference pressure.

2. The article of claim 1 wherein said means for exerting a reference pressure against said first reagent is a weighted flexible pouch filled with coated pellets of the same composition as said second reagent and an additional liquid reagent, the reagents in said pouch being reactive with each other to generate a gas of a predetermined pressure.

3. The article of claim 1, wherein said valve means includes a plunger and wall portion in said top section puncturable by said plunger, said wall portion also being rupturable by pressures above a safe pressure limit in said gas generation chamber.

4. The article of claim 1 wherein each said base, middle and top sections, are formed of plastic and joined together.

5. An article of manufacture for chemically generating gas and supplying the gas to a utilization device at a predetermined pressure comprising:
  a) a container having at least one partition for defining first and second reagent chambers on opposite sides thereof;
  b) a liquid reagent in one of said chambers and a second reagent in the other of said chambers, said liquid reagent and second reagent chemically reacting to generate said gas upon contact with each other;
  c) a gas generation chamber within said container for accommodating the generated gas under pressure;
  d) reference pressure means for applying said predetermined pressure to said liquid reagent to propel said liquid reagent toward said second reagent in opposition to a force caused by the pressure of the generated gas against the liquid reagent;
  e) said at least one partition having orifice means therein of a size selected as a function of surface tension properties of the liquid reagent for permitting said liquid reagent to pass therethrough and contact the second reagent to generate said gas into said gas generation chamber only when the pressure in the gas generation chamber is less than the predetermined pressure applied to said liquid reagent by said reference pressure means, and precluding the liquid reagent from contacting the second reagent only when the pressure in said gas generation chamber is equal to or greater than said predetermined pressure; and
  f) valve means in fluid communication with said gas generation chamber for withdrawing gas therefrom when OPEN and preventing the flow of gas therefrom when CLOSED;

whereby the pressure of gas withdrawn through said valve means when OPEN is substantially maintained at said predetermined pressure.

6. The article of claim 5 wherein said reference pressure means comprises a flexible pouch filled with a second gas at said predetermined pressure, said pouch contacting the first side of said first reagent.

7. The article of claim 6 wherein the second gas is generated by a chemical reaction of additional reagents contained within said flexible pouch.

8. The article of claim 5 wherein said reference pressure means is a compression spring which exerts a force against said first side of the first reagent.

9. The article of claim 5 wherein said reference pressure means is a bellows filled with a supply of gas at said predetermined pressure, said bellows exerting a force on the first side of said first reagent.

10. The article of claim 7, wherein said additional reagents include coated pellets and a liquid reagent for generating a desired pressure once the coating has dissolved.

11. The article of claim 7, further including filter means placed over said orifice means.

12. The article of claim 5, wherein said second reagent is also a liquid.

* * * * *

UNITED STATES PATENT AND TRADEMARK OFFICE
CERTIFICATE OF CORRECTION

PATENT NO. : 5,102,627
DATED : April 7, 1992
INVENTOR(S) : George Plester It is certified that error appears in the above-identified patent and that said Letters Patent is hereby corrected as shown below:

On the Title page, item [22], change the filing date to read

--October 17, 1989--.

Signed and Sealed this

Twelfth Day of October, 1993

*Attest:*

BRUCE LEHMAN

*Attesting Officer*      *Commissioner of Patents and Trademarks*